(12) United States Patent
Aidan et al.

(10) Patent No.: US 6,480,874 B1
(45) Date of Patent: Nov. 12, 2002

(54) POWER SAVING METHOD FOR PERFORMING ADDITIONS AND SUBTRACTIONS AND A DEVICE THEREOF

(75) Inventors: Fabrice Aidan, Raanana (IL); Yoram Salant, Rosh-Haain (IL); Mark Elnekave, Ramat-Gan (IL); Leonid Tsukerman, Haifa (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/436,890

(22) Filed: Nov. 9, 1999

(51) Int. Cl.$^7$ ............................................... G06F 7/50
(52) U.S. Cl. ........................................ 708/700; 711/220
(58) Field of Search ............................. 708/700, 701, 708/702, 703, 704, 705, 706, 707, 708, 709, 710, 711, 712, 713, 714; 711/200, 219, 220

(56) References Cited

U.S. PATENT DOCUMENTS

| | | | | |
|---|---|---|---|---|
| 5,260,898 A | * | 11/1993 | Richardson | ................. 708/490 |
| 5,333,119 A | | 7/1994 | Raatz et al. | |
| 5,828,591 A | * | 10/1998 | Rotstain | ..................... 708/654 |
| 6,298,369 B1 | * | 10/2001 | Nguyen | ....................... 708/620 |

* cited by examiner

Primary Examiner—Chuong Dinh Ngo

(57) ABSTRACT

A power saving device and method for either adding or subtracting a constant from an operand, by checking a logic value of a portion of the operand and deciding whether to activate a multi-bit adder or to perform the subtraction or addition by inverting a portion of the operand. The power saving device and method is especially efficient when the constant K equals $2^n$. Then, the n'th bit of the operand is checked and if the addition or subtraction operation can be performed by inverting the n'th bit of the operand, a result is generated by that inversion, while a multi-bit adder is disabled.

10 Claims, 3 Drawing Sheets

US 6,480,874 B1

POWER SAVING METHOD FOR PERFORMING ADDITIONS AND SUBTRACTIONS AND A DEVICE THEREOF

FIELD OF THE INVENTION

Power saving method for performing additions and subtractions and device thereof and especially a power saving address generation unit and a method thereof.

BACKGROUND OF THE INVENTION

Multi-bit adders, and especially high-speed adders are comprised of many transistors. For example, a 32 bit adder is comprised of more than a thousand CMOS transistors. 32-bit adders and even larger adders are extensively used in modern processor address generating units.

A premium is placed upon low power consumption of modern processors, especially in electrical devices that are powered by batteries. It is very important to reduce the energy consumption associated with very frequent operations such as subtraction and additions. It is convenient to reduce the power associated with address generation, especially when the subtraction and addition involve an operand ("old" address) and a constant K, wherein K usually equals $2^n$.

There is a need of a power saving method for performing additions and subtractions and device thereof and especially a power saving address generation unit and a method thereof.

BRIEF DESCRIPTION OF THE DRAWINGS

While the invention is pointed out with particularity in the appended claims, other features of the invention are disclosed by the following detailed description taken in conjunction with the accompanying drawings, in which:

DESCRIPTION OF THE PREFERRED EMBODIMENT

Generally, the present invention provides a power saving device and method for either adding or subtracting a constant from an operand, by checking a logic value of a portion of an operand and deciding whether to activate an adder or to perform the subtraction or addition by inverting a portion of the operand. The checking and inverting operations consume a minimal amount of power. For example, the checking and inverting involves activating about two hundred transistors.

Especially, the present invention provides a power saving device and method for adding or subtracting a constant K, $K=2^n$ to an operand, by checking a logic value of an n'th bit of the operand. And accordingly either activating a multi-bit adder or disabling the multi-bit adder and providing a result that is derived from the operand, wherein the n'th bit of the operand is inverted.

Especially, the invention provides a power saving address generation unit having an addition and subtraction unit, for receiving an operand, usually an "old" address, and control signals determining whether to increase or decrease the "old" address by K, and to provide an updated address.

It should be noted that the particular terms and expressions employed and the particular structural and operational details disclosed in the detailed description and accompanying drawings are for illustrative purposes only and are not intended to in any way limit the scope of the invention as described in the appended claims.

Figure 1:
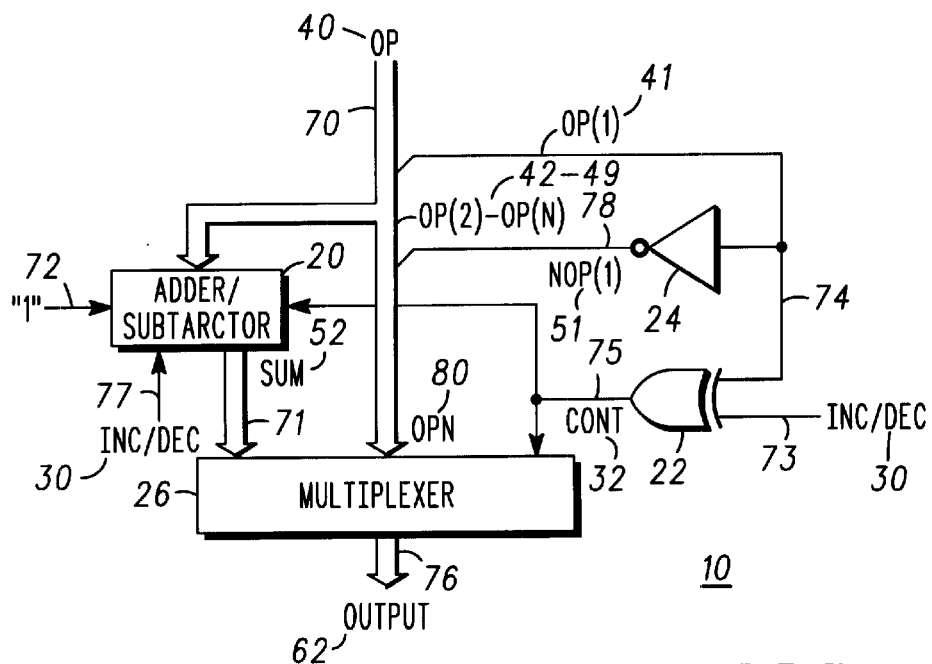
FIGS. 1–2 are block diagrams of an adding and subtracting unit, according to a preferred embodiment of the invention.
Figure 2:
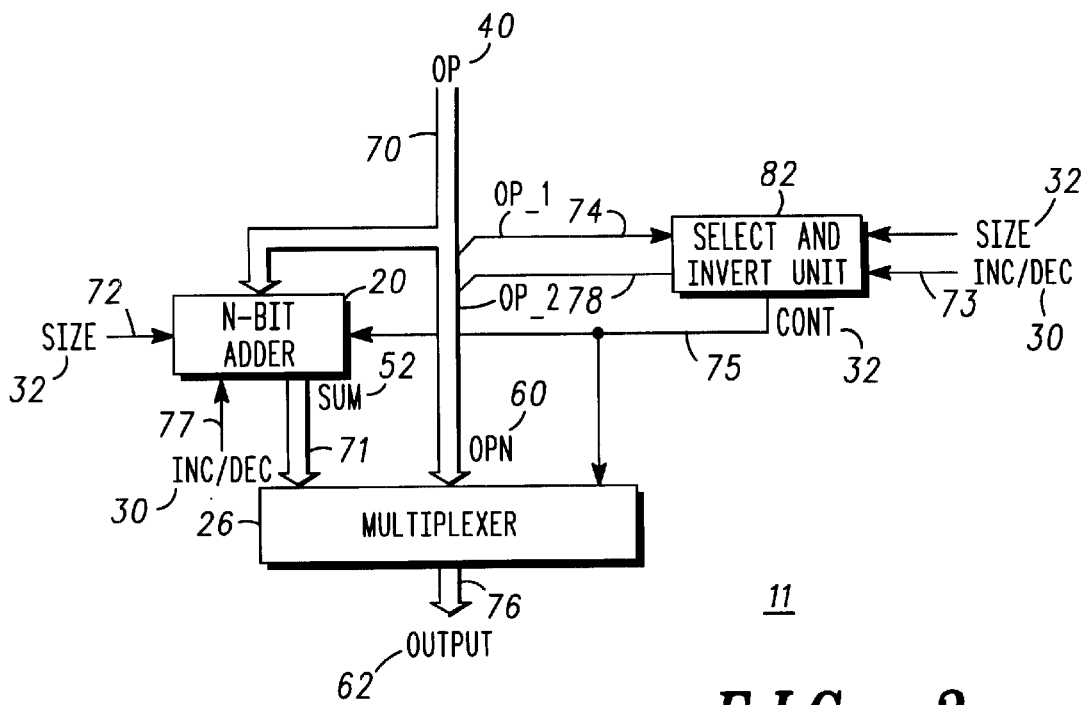

FIG. 1 is a block diagram of an adding and subtracting unit 10, according to a preferred embodiment of the invention. FIG. 2 is a block diagram of an adding and subtracting unit 11, according to a preferred embodiment of the invention. Adding and subtracting unit (i.e.—ASU)10 is adapted to check the least significant bit OP[1] 41 of an operand OP 40 and to determine whether to activate a multi-bit adder and subtractor or not. For example, if there is a need to add "1" to OP 40 (a control signal INC/DEC="0"), and the least significant bit of OP 40 is "0", an multi-bit adder/subtractor 20 within ASU 10 is disabled, and ASU provides a multi-bit output result (i.e.—OUTPUT) 62, all the bits of OUTPUT 62 except the least significant bit (i.e.—lsb) are equal to OP 40, the lsb of OUTPUT 62 equals "1". Adding and subtracting unit (i.e. ASU) 11 of FIG. 2 can check a variety of bits out of operant OP 40, invert some of them and accordingly decide whether to activate multi-bit adder/subtractor 20.

ASU 10 is comprised of the multi-bit adder and subtractor (i.e.—AS) 20, a multiplexer 26, a logic NOT gate (i.e.—NOT) 24 and a logic XOR gate 22. ASU 10 receives a control signal INC/DEC 30 from a control unit (not shown in FIG. 1) for determining whether to perform a subtraction or addition operation. AS 20 receives OP 40 via bus 70, INC/DEC 30 via bus 77, a constant having value of "1" via bus 72 and a control signal CONT 32 that enables/disables it. If AS 20 is activated it provides an output signal SUM 52 via bus 71. SUM 52 equals OP−1 when INC/DEC 30 has a first logic value and equals OP+1 when INC/DEC has a second logic value.

XOR 22 receives INC/DEC via bus 73, receives OP[1] 41 via bus 74 and provides a CONT 32 via bus 75. CONT 32 disables AS 20 when either INC/DEC="1" and OP[1]=1 or INC/DEC="0" and OP[1]="0".

NOT 24 receives the OP[1] 41 via bus 74, inverts it and provides an inverted lsb NOP[1] 51. NOP[1] 51 and the remaining bits OP[2]–OP[N] 42–49 of OP 40 form a signal OPN 60, that is provided to multiplexer 26.

When CONT equals "1" AS 20 is enabled, and multiplexer 26 selects SUM 52, else multiplexer selects OPN 60. The selected signal, denoted as OUTPUT 62 is outputted via bus 76.

ASU 11 of FIG. 2 is analogues to ASU 10 of FIG. 1 bus instead of NOT 24 and XOR 22 has a select and invert unit 82. Select and invert unit 82 can check a variety of bits OP−1 out of operant OP 40, invert some of them and accordingly decide whether to activate multi-bit adder/subtractor 20 and whether multiplexer 26 selects SUM 52 or signal OPN 60, OPN is comprised of a portion OP_2 of OP 40 and the output signal NOP of select and invert unit 82. ASU 11 receives an additional control unit SIZE 32 which determines which bit (or bits) of OP 40 to check and accordingly to invert. Furthermore, AS 20 adds or subtracts SIZE 32 from OP 40. Usually SIZE=$2^n$ and select and invert unit 82 checks the n'th bit of OP 40, and according to the value of that bit and of INC/DEC 30 decides whether to enable AS 20 or to provide a valid APN signal to multiplexer 26.

It is well known in the art that the average power consumption of a CMOS cell is proportional to the CMSO operating frequency. Conveniently, the adder and subtractor unit is disabled, and accordingly its power consumption is reduced, by disabling a clock signal provided to it, so that the operating frequenct of the adder and subtractor unit equals zero.

Figure 3:
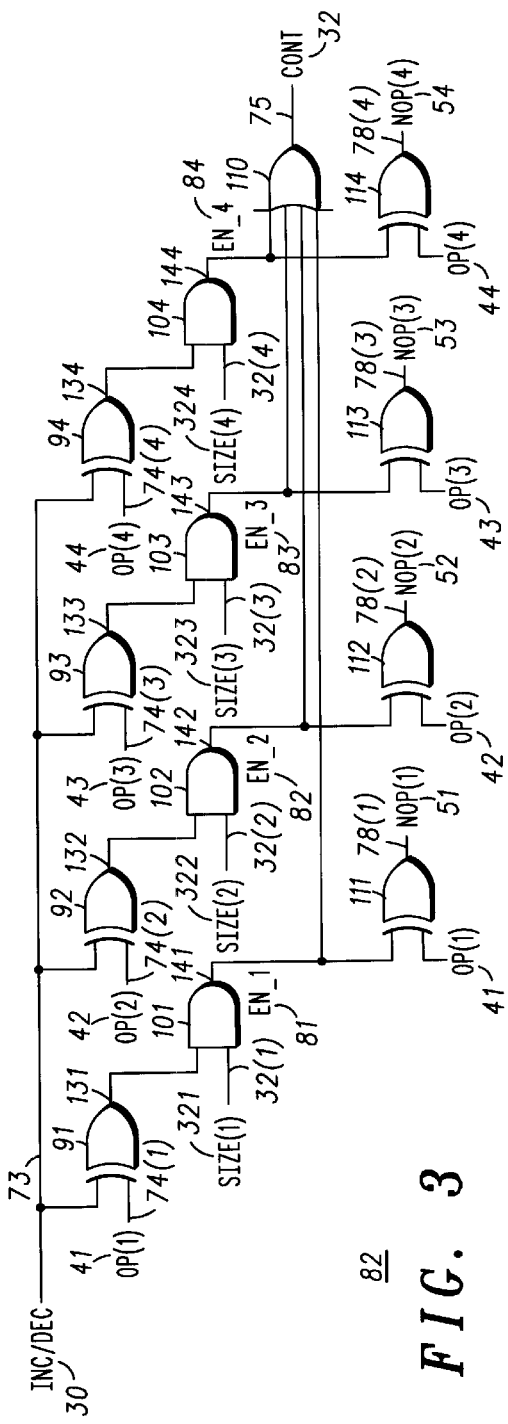
FIG. 3 is a block diagram of a four-bit select and invert unit of the adding and subtracting unit of FIG. 2, according to a preferred embodiment of the invention.

FIG. 3 is a block diagram of a four bit select and invert unit 82. Select and invert unit 82 receives a four-bit SIZE 32. If one of the bits of SIZE 32 is set, select and invert unit 82 checks a bit of OP 40 that is associated to the set bit of SIZE 32 and inverts the associated bit of OP 40. Furthermore, and depending upon the value of INC/DEC 30 it either enables or disables AS 20.

Select and invert unit 82 comprises of eight XOR logic gates (i.e.—XOR) 91–94, 111–114, each having two inputs and an output; four AND logic gates (i.e.—AND) 101–104, each having two inputs and an output and OR logic gate (i.e.—OR) 110 having four inputs and an output.

XORs 91–94 receive OP[1] 41–OP[4] 44 via lines 74[1]–74[4] accordingly and INC/DEC 30 via bus 73. ANDs 101–104 receive the output signals of XORs 91–94 and SIZE[1] 321–SIZE[4] 324 accordingly and provide enable signals EN_1–EN_4 81–84 to XORs 111–114 accordingly and to four inputs of OR 110.

XORs 111–114 also receive OP[1]–OP[4] 41–44 accordingly and provide an output signal NOP[1]–NOP[4] 51–54, whereas OP[5]–OP[N] and NOP[1]–NOP[4] 51–54 form signal OPN 60 to be provided to multiplexer 26.

When one of SIZE[1]–SIZE[4] is set, it causes the AND gate associated therewith to produce an enable signal. The enable signal is provided to OR 110, that outputs CONT 32, for disabling AS 20. Furthermore, the operand bit that is associated to the set SIZE bit is inverted by a XOR and sent to multiplexer 26. For example if INC/DEC=1, OP[3]=0, SIZE[3]=1 and SIZE[1], SIZE[2], SIZE[4]="0" then XOR 93, receiving OP[3]=0 and INC/DEC=1, output an output signal having value of 1 to AND 103. AND 103 also receives SIZE[3]=1 and outputs an enable signal EN_3 that equals "1". AND 101, 102 and 104 receive SIZE[1], SIZE[2] SIZE[4]=0 and output control signals EN_1, EN_2 EN_4= 0. OR 110 receives ER_1, ER_2, ER_4=0 and ER_3="1" and outputs "1". Thus, AS 20 is disabled. XORs 111, 112, 114 receive EN_1, EN_2, EN_4=0 and OP[1], OP[2], OP[4] and do not invert OP[1], OP[2], OP[4]. XOR 113 receives OP[3] and EN_3=1 and inverts OP[3]. XORs 111–114 provide an output signal NOP[1]–NOP[4], whereas only NOP[3] 53 is inverted. NOP[1], NOP[2], NOP[4] equal OP[1], OP[2], OP[4].

Figure 4:
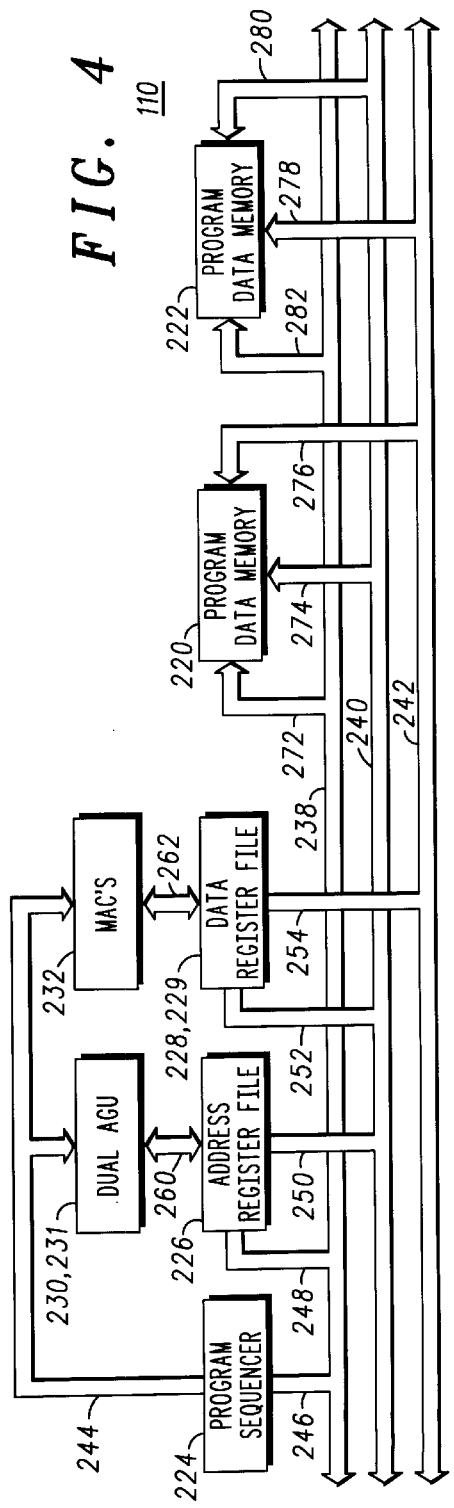
FIG. 4 is a block diagram of a processor having an adding and subtracting unit, according to an embodiment of the invention.
Figure 5:
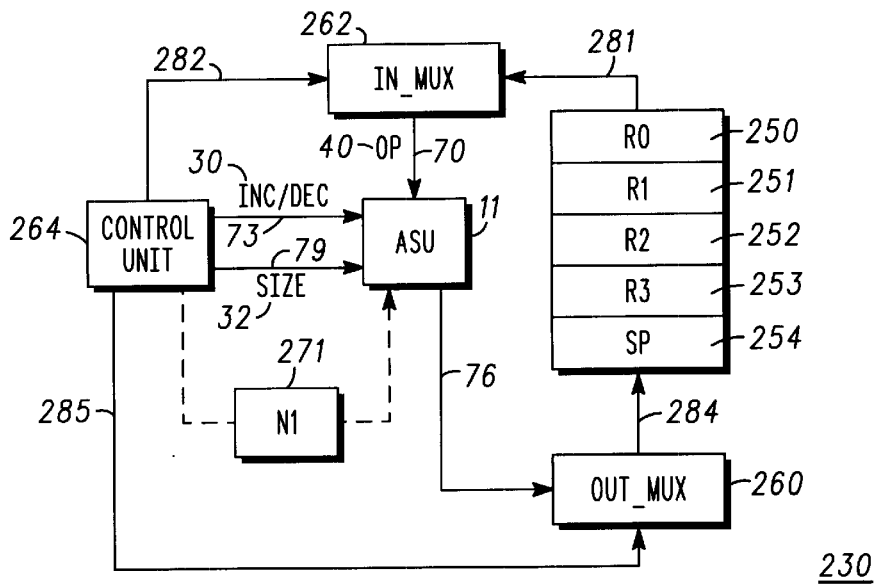
FIG. 5 is a block diagram of an address generating unit having a adding and subtracting unit adding and subtracting unit, according to an embodiment of the invention.

FIG. 4 is a block diagram of a processing system 110 having an adding and subtracting unit, according to an embodiment of the invention;

FIG. 5 is a block diagram of address generating unit 230 having an adding and subtracting unit 11, according to an embodiment of the invention. Preferably, processing system 10 is characterized by having a Very Long Instruction Word, but it is necessary. A very long instruction word is used in parallel processing systems. Each Very long instruction word comprise of a plurality of instructions, that are executed in a parallel manner by various portions of the processing system.

The processing system 110 has internal memory modules 220, 222, an address register file 226, a program sequencer 224, data register files 228 and 229, address generation units (AGU) 230 and 231 and multiply and accumulate (MAC) units that are collectively denoted 232. AGUs 230 and 231 are coupled to the address register file 226 via internal bus 260. MAC units 232 are coupled to the data register files 228, 229 via internal bus 262. The program sequencer 224 is coupled via the instruction bus 244 to the AGU 230 and 231 and the MACs 232.

Processing system 10 further includes a program bus 238, a first data bus 240, a second data bus 242, and a peripheral bus 88 (not shown in FIG. 4). The program bus 238 is coupled to the program sequencer 224 via bus 246, to internal memory 220, 222 via buses 272 and 282 respectively. The data buses 240, 242 are coupled to address register file 226 via buses 248, 250, and to data register files 228, 229 via buses 252, 254. The data buses 240, 242 are coupled to memory 220, 222 via buses 274–280.

Program sequencer 224 fetches from memory 220 and/or memory 220 a Very Long Instruction Word (i.e.—VLIW), and dispatches portions of the VILW to MACs 232 and AGUs 230 and 231. AGUs 230 and 231 provide memories 220 and 222 addresses of either data or VLIW to be fetched during a next operating cycle. Usually ASU 11 receives OP 40 from either a register of address register file 226 or from program sequencer 224, via bus 244. Each of AGUs 230 and 231 are adapted to provide a single address during each operation cycle.

FIG. 5 is a block diagram of AGU 230 and a portion 280 of address register file 226 within processing system 110, AGU 230 having an ASU 11, according to an embodiment of the invention.

AGU 230 is comprised of control unit 264, a register N1 and ASU 11. Portion 280 of address register file 226 is comprised of a plurality of registers R0,R1,R2,R3,SP 250–254 and two multiplexers IN_MUX 262 and OUT_MUT 260. Control unit 264 receives an instruction from program sequencer 224 (shown in FIG. 4) and sends control signals to portion 280, to ASU 11 and to N1, for controlling a generation of an updated address. Control unit sends control signals, via buses 282 and 285 to IN_MUX 260 and to OUT_MUX 262 for selecting which register is involved in the generation of the updated address. IN_MUX 70 is coupled, via bus 281 to resisters R0,R1,R2,R3,SP 250–254, and according to the control signal it receives it selects which register will supply OP 40 to ASU 11. ASU 11 receives OP 40 via bus 70, receives INC/DEC 30 and SIZE 32 from control unit 264, via buses 73 and 79 and generates an updated address. ASU 11 then provides the updated address to the selected register, via bus 76, OUT_MUX 260 and bus 284.

As indicated by the dashed lines, AGU 230 can also add or subtract the content of register N1 from OP 40.

The operation of portion 280 and AGU 230 is further explained by the following examples:

The instruction "MOVE.2L (R1)+" involves the generation of an updated address that equals the content of R1 251 plus eight. "2L" means an eight-byte data word, thus SIZE= 8. R1 251 is selected and INC/DEC=1.

The instruction "MOVE.B (R2)−" involves the generation of an updated address that equals the content of R2 252 minus one. "B" means a single byte data word, thus SIZE=1. R2 252 is selected and INC/DEC=0.

Figure 6:
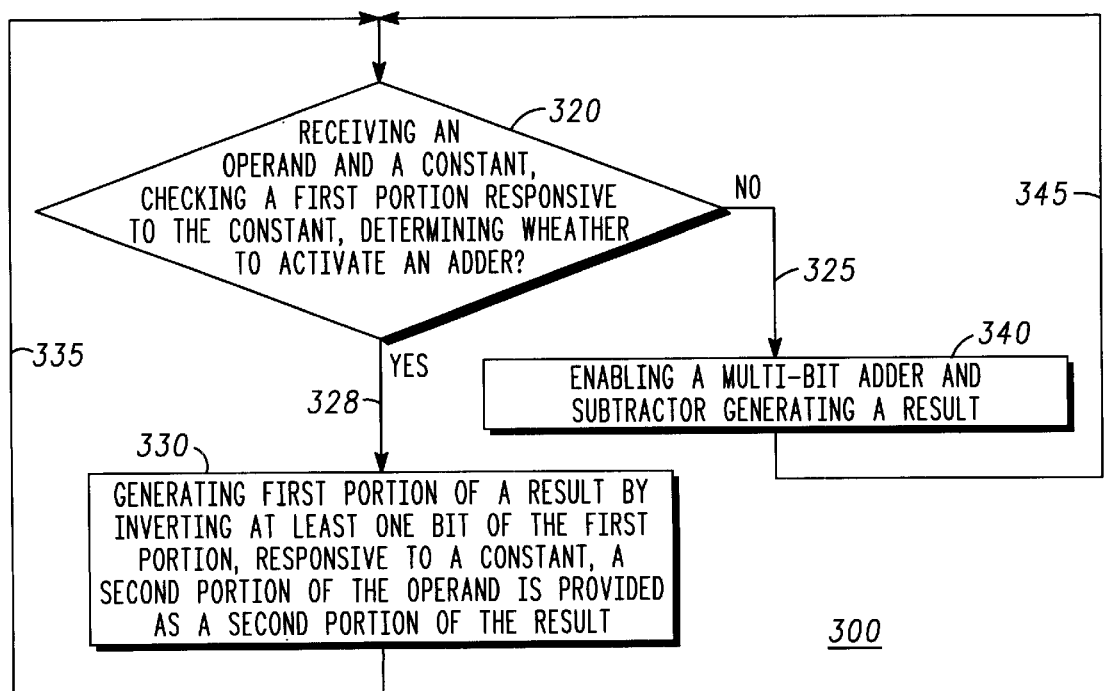
FIG. 6 illustrates in flow chart form, a power saving method for performing addition and subtraction operations, in accordance with the present invention.

FIG. 6 illustrates in flow chart form, a power saving method 300 for performing addition and subtraction operations, in accordance with the present invention. Method 300 is especially effective when a constant K, $K=2^n$ is either added or subtracted to an operand.

Rectangular boxes 320, 330 and 340 represent steps of method 300. As indicated by paths 328 and 325 step 320 can be followed by either step 330 and 340 accordingly. As indicated by paths 335 and 345, steps 330 and 340 are followed by step 320.

Method 300 comprises of the steps of:

Receiving, during step 320, operand (i.e.—OP) 40, checking a first portion of OP 40 and determining whether there is a need to perform a selected operation out of an addition operation and a subtracting operation. Conveniently, all the possible values of the constant can be expressed by the bits of the first portion of OP 40.

For example, if the constant can range between 1 and 64, the first portion will comprise of seven least significant bits of OP 40. If the selected operation can be performed by inverting at least one bit of the first portion, responsive to the constant, jumping to step 330 for generating a result by inverting at least one bit of the portion. Else, jumping to step 340 for generating a result by a multi-bit adder and subtractor.

Preferably, when K is either added or subtracted from OP 40, at least the n'th bit of the OP 40 is checked and inverted. If K ranges between $2^{n1}$ to $2^{n2}$, then the n1'th till n2'th bits of OP 40 are checked. When there is a need to add $2^n$ to OP 40 and the n'th bit of OP 40 is "0", or when there is a need to subtract $2^n$ to OP 40 and the n'th bit of OP 40 is "1" then step 320 is followed by step 330.

Generating a result, during step 330, by inverting at least one bit of OP 40, responsive to the constant. Conveniently, a constant K, $K=2^n$ is added or subtracted to OP 40 and accordingly the n'th bit of OP 40 is inverted. Jumping to optional step 320 if step 310 is performed only once, else jumping to step 310.

Generating a result, during step 340, by enabling an multi-bit adder and subtractor and providing it with OP 40 and a constant to be either subtracted or added to OP 40.

Jumping to optional step 320.

Thus, there has been described herein an embodiment including at least one preferred embodiment of a power saving method for performing additions and subtractions and device thereof. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. A power saving adding and subtracting unit for adding and subtracting a constant from an operand, the power saving adding and subtracting unit is adapted to receive the operand and the constant and perform a selected operation out of adding operation and subtracting operation, the power saving adding and subtracting unit comprising:

a detect and invert logic, for receiving a first portion of the operand; checking whether the selected operation can be performed by inverting at least one bit of the first portion of the operand, responsive to the constant; wherein if the answer is YES, disabling the multi-bit adder and subtractor and generating a first portion of a result by inverting at least one bit of the portion of the operand, responsive to the constant;

a multi-bit adder and subtractor unit for generating a second result by performing the selected operation; and a selection means for selecting the second result when the adder and subtractor is enabled, and for selecting a first result comprising from a second portion of the operand that was not sent to the detect and invert logic and the first portion of the first result when the selected operation is performed by inverting at least one bit of the first portion of the operand responsive to the constant.

2. The power saving adding and subtracting unit of claim 1 wherein the constant ranges between $2^{n1}$ to $2^{n2}$ and the first portion of the operand are the n1'th till n2'th bits of operand.

3. The power saving adding and subtracting unit of claim 2 wherein the adder and subtractor unit is disabled by reducing its operating frequency.

4. The power saving adding and subtracting unit of claim 1 being a part of an address generation unit.

5. The power saving adder and subtracting unit of claim 4 wherein the address generation unit further comprises of:

a plurality of registers for providing the operand and for storing the result;

a control unit, coupled to the plurality of registers, for providing control signals determining the selected operation and a selected register out of the plurality of registers, the selected register providing the operand; and a selection logic for coupling the selected register to the adding and subtracting unit.

6. The power saving adding and subtracting unit of claim 4 wherein the address generation unit in formed within a parallel processing system.

7. A power saving method for performing a selected operation out of adding a constant to an operand and subtracting the constant of the operand, the operand is comprised of a first portion and a second portion, the method comprising the steps of:

receiving the operand, checking the first portion of the operand and determining whether the selected operation can be performed by inverting at least one bit of the first portion, responsive to the constant; if the answer is YES jumping to a step for generating a result by inverting at least one bit of the first portion, responsive to the constant; if the answer is NO jumping to a step for generating a result by a multi-bit adder and subtractor;

generating a first portion of a result by inverting at least one bit of the first portion, responsive to the constant, providing a result comprising of the second portion of the operand and of the first portion of the result and jumping to the step of receiving the operand;

enabling a multi-bit adder and subtractor unit and generating a result by the multi-bit adder and subtractor; disabling the adder and subtractor unit and jumping to the step of receiving the operand.

8. The method of claim 7 wherein the constant ranges between $2^{n1}$ to $2^{n2}$, and the first portion of the operand is comprised of the n1'th till n2'th bits of the operand.

9. The method of claim 7 wherein the adder and subtractor unit is disabled by reducing its operating frequency.

10. The method of claim 7 wherein the operand is an "old" address and the result is an updated address, pointing to either data and instructions stored in a memory module.

* * * * *